United States Patent
Frank et al.

(10) Patent No.: US 9,579,943 B2
(45) Date of Patent: Feb. 28, 2017

(54) COMPRESSED AIR SUPPLY INSTALLATION AND PNEUMATIC SYSTEM

(71) Applicant: WABCO GmbH, Hannover (DE)

(72) Inventors: Dieter Frank, Hannover (DE); Frank Meissner, Hannover (DE)

(73) Assignee: WABCO GMBH, Hannover (GB)

( * ) Notice: Subject to any disclaimer, the term of this patent is extended or adjusted under 35 U.S.C. 154(b) by 0 days.

(21) Appl. No.: 14/526,016

(22) Filed: Oct. 28, 2014

(65) Prior Publication Data

US 2015/0048577 A1 Feb. 19, 2015

Related U.S. Application Data

(63) Continuation of application No. 13/993,283, filed as application No. PCT/EP2011/005864 on Nov. 22, 2011, now Pat. No. 8,899,598.

(30) Foreign Application Priority Data

Dec. 16, 2010 (DE) ........................ 10 2010 054 704

(51) Int. Cl.
 *B60G 17/052* (2006.01)
 *F16K 31/06* (2006.01)
 (Continued)

(52) U.S. Cl.
 CPC ....... *B60G 17/0523* (2013.01); *B60G 17/052* (2013.01); *F04B 17/03* (2013.01);
 (Continued)

(58) Field of Classification Search
 CPC ............ B60G 17/0523; B60G 17/0155; B60G 17/0525; B60G 17/0528; B60G 17/056;
 (Continued)

(56) References Cited

U.S. PATENT DOCUMENTS 4,570,972 A 2/1986 Pangos
4,655,255 A 4/1987 Rode
(Continued)

FOREIGN PATENT DOCUMENTS

DE 2 016 030 2/1972
DE 80 08 352 8/1980
(Continued)

*Primary Examiner* — James English
(74) *Attorney, Agent, or Firm* — Leydig, Voit & Mayer, Ltd.

(57) ABSTRACT

A compressed air supply installation for operating a pneumatic installation, especially an air suspension installation of a vehicle, includes an air supply unit and an air compression unit for supplying a compressed air supply unit with compressed air, a pneumatic connection, especially a bleeding line, comprising a bleeding valve and a bleeding port for bleeding air, and a pneumatic connection, especially a compressed air supply line having an air drier and a compressed air port for supplying the pneumatic installation with compressed air The air drier has a drier container through which compressed air can flow and which contains a desiccant. The drier container has a wall forming a desiccant-free recess, and at least part of the bleeding valve system is arranged in the recess.

15 Claims, 8 Drawing Sheets

(51) Int. Cl.
*F04B 17/03* (2006.01)
*F04B 39/16* (2006.01)
*B01D 53/26* (2006.01)

(52) U.S. Cl.
CPC .......... *F04B 39/16* (2013.01); *F16K 31/0651* (2013.01); *F16K 31/0658* (2013.01); *F16K 31/0675* (2013.01); *B01D 53/261* (2013.01); *B60G 2202/152* (2013.01); *B60G 2300/07* (2013.01); *B60G 2500/2012* (2013.01); *B60G 2500/2021* (2013.01); *B60G 2500/2044* (2013.01); *B60G 2600/26* (2013.01); *B60G 2600/66* (2013.01); *Y10T 137/86051* (2015.04)

(58) Field of Classification Search
CPC .......... B60G 17/0565; B60G 2202/152; B60G 2500/302; B60G 2500/2042; B60G 2500/2044
USPC ....... 60/407; 96/106; 137/12, 487.5, 565.18, 137/613, 624.13, 624.15; 180/41; 417/313; 267/64.28; 280/5.514, 6.157, 280/124.16
See application file for complete search history.

(56) References Cited

U.S. PATENT DOCUMENTS

| | | | |
|---|---|---|---|
| 4,738,454 A | 4/1988 | Watanabe | |
| 4,755,196 A * | 7/1988 | Frania | B60T 17/004 96/116 |
| 4,756,548 A | 7/1988 | Kaltenthaler et al. | |
| 4,793,981 A | 12/1988 | Doyle et al. | |
| 5,129,927 A | 7/1992 | Tsubouchi | |
| 5,467,595 A | 11/1995 | Smith | |
| 5,600,953 A | 2/1997 | Oshita et al. | |
| 5,711,150 A | 1/1998 | Oshita et al. | |
| 5,855,379 A | 1/1999 | Buma et al. | |
| 6,074,177 A | 6/2000 | Kobayashi et al. | |
| 6,726,224 B2 * | 4/2004 | Jurr | B60G 17/0523 280/124.16 |
| 7,100,372 B2 | 9/2006 | Ohshita et al. | |
| 7,441,789 B2 | 10/2008 | Geiger et al. | |
| 7,484,747 B2 | 2/2009 | Geiger | |
| 7,552,932 B2 | 6/2009 | Matern et al. | |
| 7,905,557 B2 | 3/2011 | Frank et al. | |
| 2006/0006733 A1 | 1/2006 | Geiger | |
| 2009/0309413 A1 | 12/2009 | Bensch et al. | |
| 2013/0318954 A1 | 12/2013 | Frank et al. | |

FOREIGN PATENT DOCUMENTS

| | | |
|---|---|---|
| DE | 32 16 329 C2 | 11/1983 |
| DE | 35 01 708 A1 | 7/1986 |
| DE | 35 14 989 A1 | 10/1986 |
| DE | 35 42 974 A1 | 6/1987 |
| DE | 195 35 972 C2 | 4/1996 |
| DE | 199 11 933 B4 | 9/1999 |
| DE | 102 42 543 A1 | 4/2004 |
| DE | 10 2004 035 763 A1 | 3/2006 |
| DE | 10 2006 041 010 A1 | 3/2008 |
| EP | 1 165 333 B2 | 1/2002 |
| EP | 1 233 183 B1 | 8/2002 |
| JP | 63-43629 | 2/1988 |
| JP | 63-130125 | 6/1988 |
| JP | 63-130126 | 6/1988 |
| JP | 63-176528 | 7/1988 |
| JP | 2006-095471 | 4/2006 |
| JP | 2008-163843 | 7/2008 |

* cited by examiner

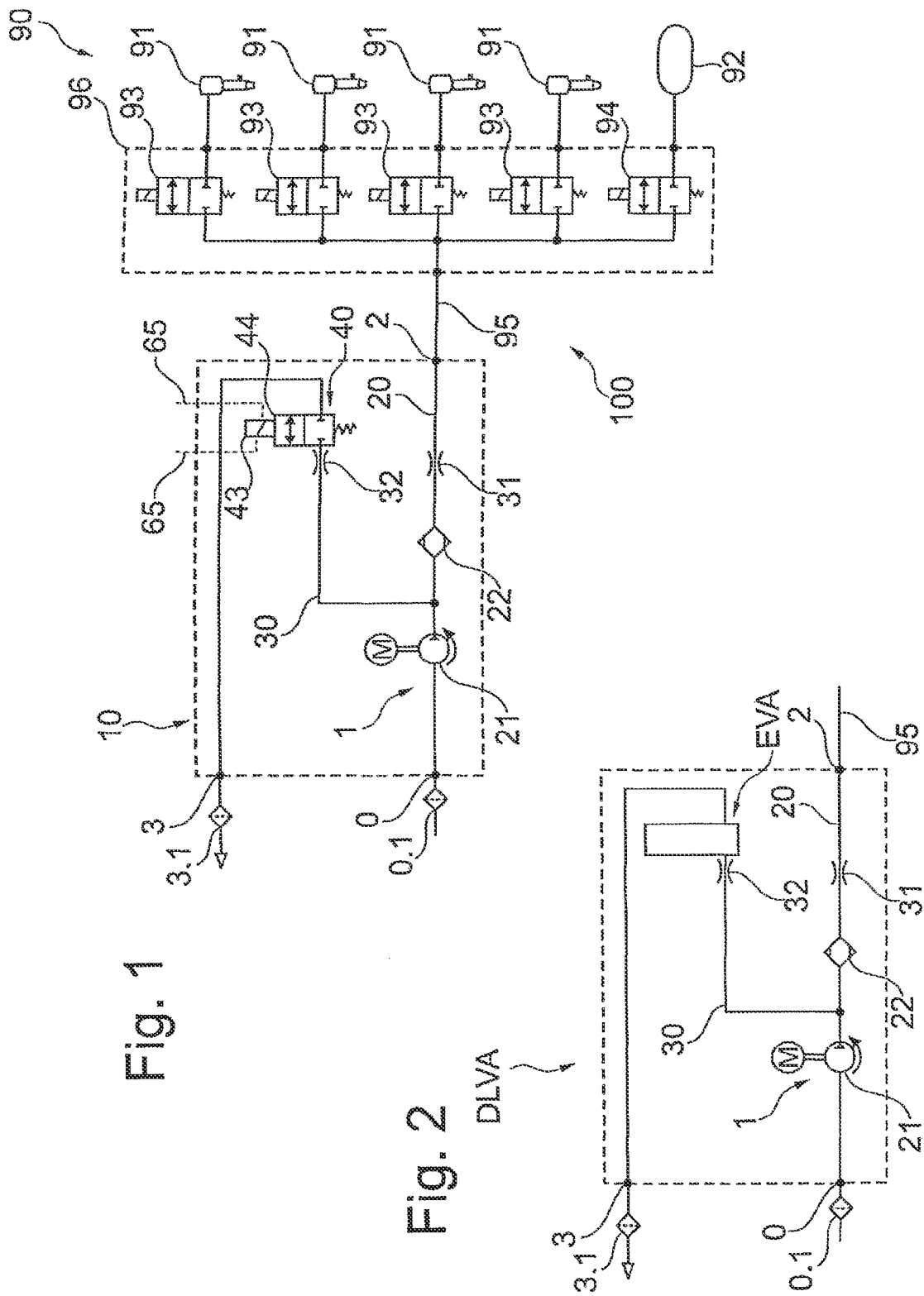

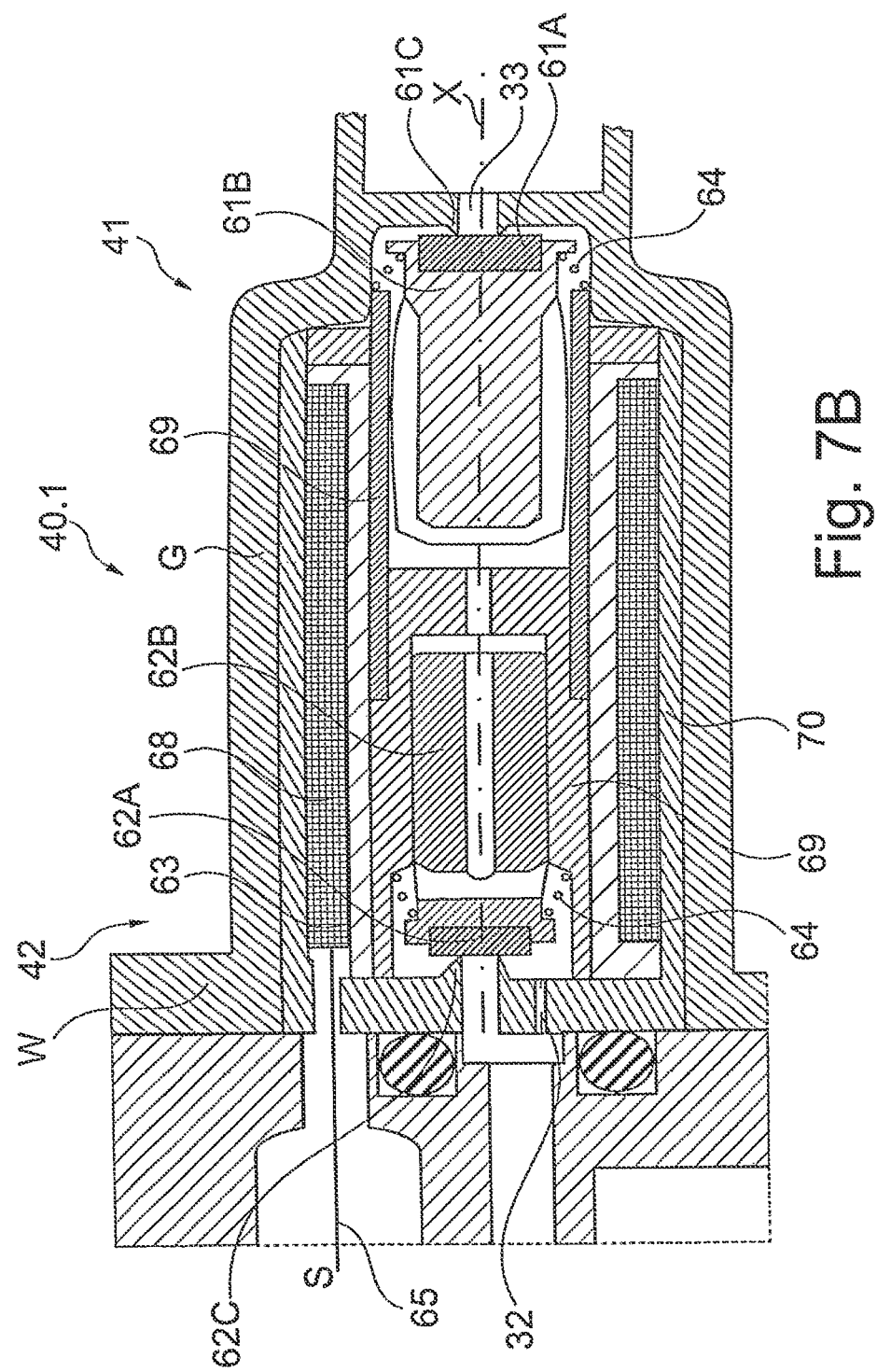

COMPRESSED AIR SUPPLY INSTALLATION AND PNEUMATIC SYSTEM

CROSS-REFERENCE TO RELATED APPLICATIONS

This application is a continuation of and claims the benefit of U.S. Ser. No. 13/993,283 filed Jun. 11, 2013; as such, this application claims the benefit of and priority to PCT/EP2011/005864 filed on Nov. 22, 2011, and DE 102010054704.2 filed on Dec. 16, 2012, the disclosures of all of which are hereby incorporated herein by reference in their entireties.

FIELD OF THE INVENTION

The invention generally relates to a compressed air supply installation and to a pneumatic system having such compressed air supply installation.

BACKGROUND OF THE INVENTION

Compressed air supply installations are used in all kinds of vehicles, particularly to supply vehicle air suspension systems with compressed air. Air suspension systems may also include level control mechanisms, with which the distance between the vehicle axle and the vehicle body can be set. An air suspension system in a pneumatic system comprises a number of air bellows pneumatically connected to a common line (header), which lift the vehicle body as they fill up and lower it as they deflate. As the distance between the vehicle axle and the vehicle body, or ground clearance, increases, the spring deflections become longer and even relatively significant surface unevenness can be overcome without coming into contact with the vehicle body. Systems of this kind are used in off-road vehicles and sports utility vehicles (SUVs). Particularly in the case of SUVs with very powerful engines, it is desirable for the vehicle to be provided, on the one hand, with comparatively low ground clearance for high-speed road driving and, on the other hand, with comparatively high ground clearance for off-road driving. It is furthermore desirable for a change in ground clearance to be made as quickly as possible, thereby increasing demands in relation to the speed, flexibility and reliability of a compressed air supply installation.

A compressed air supply installation for use in a pneumatic system with a pneumatic unit, for example an air suspension system, is operated using compressed air from a compressed air supply, within the limits of a pressure level of 5 to 20 bar, for example. The compressed air is made available to the compressed air supply using an air compressor. The compressed air supply is pneumatically connected to a compressed air connection to supply the pneumatic unit and, on the other hand, is pneumatically connected to a vent port. By means of a vent valve arrangement, the compressed air supply installation and/or pneumatic unit can be vented towards the vent port by releasing air.

In order to realize long-term operation of the compressed air supply installation, the system comprises an air drier, with which the compressed air can be dried. The accumulation of moisture in the pneumatic system, which can otherwise lead to valve-damaging crystal formation and other undesirable effects in the compressed air supply installation and in the pneumatic unit at comparatively low temperatures, is thereby avoided. An air drier comprises a drying agent, customarily a granulate fill, through which the compressed air can flow, so that the granulate fill can adsorb moisture contained in the compressed air at comparatively high pressure. An air drier may, where appropriate, be designed as a regenerative air drier. This involves dried compressed air from the air suspension system being passed through the granulate fill at comparatively low pressure in counter-current or co-current flow relative to the filling direction during each venting cycle. The vent valve arrangement may be opened for this purpose. For an application of this kind—also referred to as pressure swing adsorption—it is desirable for a compressed air supply installation to be flexibly and, at the same time, reliably designed. In particular, comparatively rapid venting should be made possible, yet there should be a sufficient pressure swing to allow regeneration of the air drier.

A solenoid valve for implementing a multiple function may be realized with at least three connected pneumatic chambers—namely, for the pneumatic connection of functionally different pneumatic chambers, which are always separate and have different pressures applied to them—having two mechanically separate lifting armatures in a common exciter winding of the solenoid valve. Each of the lifting armatures is allocated to a different separate pneumatic chamber in this case. A dual-armature solenoid valve of this kind is disclosed in principle in DE 201 60 30, for example, or in the present applicant's DE 35 01 708 A1 or DE 10 2006 041 010 A1, for example. The basic method of operation of a dual-armature solenoid valve can be derived from the applicant's DE 10 2004 035 763 A1, for example.

The applicant's DE 35 429 74 A1 discloses a level control mechanism for vehicles with air filters, with which a predetermined distance between the vehicle cell and the vehicle axle can be maintained by inflating or deflating the air springs according to the vehicle load. The mechanism contains a safety valve that can be controlled using the pressure in the air springs. A compressed air supply installation of this kind can be further improved.

DE 199 11 933 B4 discloses a compressed air generator having an air drier with a first compressed air supply line, wherein the compressed air is conducted through a drying agent, and with a second compressed air supply line, in which the compressed air is not conducted through the drying agent.

A compressed air supply installation of the general type under consideration is also disclosed in EP 1 165 333 B2 in the context of a pneumatic system with an air suspension system. Apart from a separately closable main venting line, this exhibits a high-pressure venting line with an additional high-pressure vent valve alongside the main vent valve pneumatically actuated using a control valve in the main venting line and which is connected in parallel to the main venting line. The free flow-through cross-section of the separate high-pressure vent valve is smaller than that of the main vent valve. A compressed air supply installation of this kind can also be further improved. When a compressed air supply installation of this kind is vented via the high-pressure venting line, dry air is vented, which is not used to regenerate the drying agent. This represents an unnecessary waste of dry air, particularly in the event that a suitable flexible, rapid and yet reliable actuation of the compressed air supply installation with a correspondingly high actuation rate should be necessary for the above applications. Although a main vent valve that can be configured with a comparatively large nominal width can be pneumatically pre-controlled via the control valve provided with a comparatively small nominal width, an arrangement of this kind designed for the indirect connection of a pressure volume is comparatively expensive.

A compressed air control mechanism with an air drier is disclosed in EP 1 233 183 B1. The housing of the air drier includes a cup-shaped drying container, the inside of which is connectable via the housing firstly to a pressurizing agent source and secondly to a connection element in the form of a pressure reservoir and/or an air spring via a valve opening. The housing exhibits an air inlet and an air outlet for compressed air in each case, the air being conducted in a flow direction from the air inlet through the drying container to the air outlet, in order to inflate the connection element. For deflation, the compressed air is removed in the opposite flow direction from the air outlet through the drying container and the housing. A controllable directional valve is integrated and fitted into the housing of the air drier, the valve serving to allow the air into the inside of the housing and the drying container during deflation. A directional valve controlling the discharge channel is actuated by at least one further controllable directional valve using the pressure during deflation. This directional valve is arranged substantially outside the housing of the air drier.

A compressed air system with an outlet valve that can be charged by a compressor and exhibits a compressed air unit is disclosed in DE 32 16 329 C2, wherein a pressure-retention valve is provided in a flow-back line between the compressed air storage container, on the one hand, and the container holding a drying agent and also the outlet valve, on the other. The outlet valve and a pressure regulator regulating it are continuously connected to a hollow rod by the container holding the drying agent.

These and other solutions from the prior art for an air drier have proved to be comparatively demanding in terms of installation space. What is needed is a compressed air supply unit having a vent valve arrangement and an air drier that can be set up in the most space-saving manner possible.

SUMMARY OF THE INVENTION

Generally speaking, the present invention addresses the problem of specifying an improved, simplified compressed air supply installation for the operation of a pneumatic unit, which is comparatively space-saving in design. In particular, a vent valve arrangement and an air drier in the compressed air supply installation should be arranged as compactly as possible relative to one another. Also, the venting and/or drying output of the compressed air supply installation should be improved. In particular, the acoustics of the compressed air supply installation should be improved, especially during venting. The problem addressed by the present invention is likewise one of specifying an advantageously designed pneumatic system with the compressed air supply installation.

The configuration of the vent valve arrangement in relation to the drying container of the air drier offers potential for saving installation space in a compressed air supply installation. Prior art solutions envisage a vent valve arrangement essentially outside a drying container of the air drier. The present invention is based on the recognition that a drying container in the air drier can be advantageously configured in order to house a vent valve arrangement at least partially in an installation space provided for the drying container. The drying container can exhibit a wall forming a recess free from drying agent and the vent valve arrangement can be disposed at least partially in the recess. A boundary of the recess can be formed by an outwardly facing side (in other words, by a side of the wall facing away from the granulate in the drying container) of the drying container wall.

This installation space-saving measure can be introduced without any losses in terms of function for the air drier or the vent valve arrangement and can be used for the advantageous synergistic operation of the air drier and the vent valve arrangement. A vent valve arrangement can be advantageously realized in a compact manner due to the attachment practically within a substantially cylindrical installation space contour of the drying container. The recess formed by the wall extends within the cylindrical installation space contour. In other words, a free space formed by the recess is created in the installation space contour, in which the solenoid valve arrangement is at least partially housed. The drying container thereby protectively surrounding the solenoid valve arrangement advantageously performs an acoustics-improving function. Moreover, due to the advantageous configuration of the solenoid valve arrangement in a section surrounded by the wall of the drying container, waste heat from the vent valve arrangement can be used to dry the granulate. The result is a compressed air supply installation that is more compactly and efficiently designed overall than prior art systems.

In accordance with embodiments of the present invention, the vent valve arrangement is configured with a valve housing completely in the drying agent-free recess of the drying container, i.e., practically without projecting out of the recess, except for incoming lines. The present invention is not limited to a particular kind of vent valve arrangement; instead, any appropriately suitable vent valve (e.g., in the form of a single vent valve or as part of a vent valve arrangement with a plurality of vent valves) may be arranged in the drying agent-free recess of the drying container. The vent valve arrangement can advantageously be created in the form of a controllable solenoid valve arrangement having a solenoid part and a pneumatic part. The pneumatic part includes the pneumatically active parts like the valve as such. The pneumatic part exhibits an armature connected to the valve body, wherein the valve body is mounted on a valve seat and the armature can be activated by the solenoid part, i.e., part of the solenoid part. The solenoid part includes the electrically and/or magnetically acting parts, such as the actuating and control means for the valve, such as the coil with the armature and coil body and also a control line or the like. At least the pneumatic part and/or the solenoid part is/are advantageously arranged in the recess. Preferably, at least one or a plurality of elements of the pneumatic part and/or the solenoid part—particularly a valve seat, a valve body, a coil body, an armature and/or a sealing element—are arranged in the recess. The pneumatic part and/or the solenoid part is/are advantageously arranged wholly or at least partly in the recess. The pneumatic part and the solenoid part are preferably arranged in a common valve housing. The valve housing is preferably arranged in the recess. The wall forming the recess serves as the valve housing.

Preferably, the drying container surrounds the solenoid valve arrangement on at least two sides, desirably on three sides or on all sides, except for the supply lines. The air drier, particularly the drying container itself, can preferably be flowed through in a reversible flow manner, i.e., bidirectionally, via air ports.

According to a preferred embodiment, the recess is arranged symmetrically to an axis of the drying container. The recess is preferably arranged parallel and/or centrally to the axis of the drying container. This also enables a comparatively uniform and particularly complete flow through the drying granulate in the drying container, notwithstanding the recess situated there. The recess advantageously exhibits a channel through the drying container through which compressed air can flow. The channel advantageously connects to a free space without any fittings upstream of the vent valve arrangement. The free space and the vent valve arrangement are preferably axially disposed relative to one another. A functional division of the drying container in an axial and radial direction is desirable. In particular, the drying container firstly exhibits a container volume with the drying granulate in an annular, radially outwardly lying casing section conducted about an axis. The container volume can be evenly flowed through by a vent flow P and/or a supply flow $\bar{P}$. In a paraxial, central section surrounded by the annular casing section, the recess free from drying agent, on the one hand, and the free space without any fittings upstream of the recess free from drying agent is formed. This firstly provides comparatively good protection for the solenoid valve arrangement. The latter arrangement of the recess and free space along an axis forms, along with the free space without any fittings, in the direction of a vent flow P upstream of the recess, a section joining up to the compressed air supply or to a pressure source interface, the section serving to homogenize and/or cool a compressed air flow before the solenoid valve arrangement is exposed to the flow.

The solenoid valve arrangement is preferably configured for the direct connection of a total compressed air volume. In particular, the solenoid valve arrangement is free from a control valve for this purpose. A direct connection of a total compressed air volume can take place in a comparatively short time—the compressed air supply installation thereby enables comparatively rapid venting of the pneumatic system. This is particularly advantageous in the case of SUVs and other sports vehicles. In some cases, these require the ground clearance or another chassis setting to be changed comparatively quickly. Moreover, a comparatively rapid venting of the compressed air supply installation may be necessary for regeneration of the air drier.

Moreover, it is also possible in principle for the vent valve arrangement to be configured as an indirectly pre-controlled solenoid valve arrangement. A control valve and a relay valve are provided for the indirect connection of a compressed air volume. An indirectly pilot-controlled solenoid valve arrangement may be configured for preferred rapid venting, in that a control valve exposed to partial pressure is designed to control the relay valve. Another possibility is to expose the control valve to a total pressure of the compressed air volume and to provide the control valve exposed in this manner to control the relay valve. This leads to a so-called normal venting function of the indirectly pilot-controlled solenoid valve arrangement.

In one embodiment, the vent valve arrangement can be a controllable solenoid valve arrangement with a solenoid part and a pneumatic part. The pneumatic part comprises a primary valve and a secondary valve. The primary valve and the secondary valve can preferably be activated using a common control means acting on both, particularly of the solenoid part of the solenoid valve arrangement. The primary valve and the secondary valve can be formed in a common housing as a dual-armature solenoid valve. In this case, a valve may quite generally be provided, which comprises a primary armature bearing a first sealing element of the primary valve and a secondary armature bearing a second sealing element of the secondary valve, wherein the primary armature and the secondary armature are arranged in a common coil body.

The valves of the solenoid valve arrangement, particularly the primary valve and the secondary valve of the dual-armature solenoid valve, may be connected in parallel or in series, normally open or normally closed, in any combination. A series arrangement and parallel arrangement of the primary and secondary valve is suitable for a particularly flexibly configured time switching sequence of the primary and secondary valve, so that different nominal widths can be made available at different times for the venting line. In this way, pressure peaks during venting can be reduced and therefore acoustics improved, in particular a venting bang can be avoided. A parallel arrangement is also advantageous to a gradual increase in the nominal widths available for the venting line, so that particularly rapid venting can take place and a venting bang can be avoided. Excessive acoustics or else a venting bang is always a risk during the venting process if an excessively large volume of compressed air is vented in too short a time, i.e., when there is an excessive pressure amplitude. On the other hand, a comparatively high pressure swing amplitude is desirable for the best possible regeneration of the air drier. The conditions required for increased efficiency in relation to venting and drier regeneration, on the one hand, and low-noise operation, on the other, may therefore be inconsistent with one another. It should be appreciated that the present invention achieves a particularly advantageous compromise between drier regeneration and venting efficiency, on the one hand, and acoustics, on the other.

Moreover, a reliable and structurally simplified solution according to the invention can be achieved in that the primary valve and the secondary valve can be activated using a common control means of the solenoid part of the solenoid valve arrangement acting on the primary valve and secondary valve. In other words, a common solenoid part of the solenoid valve arrangement can be used for the primary valve and the secondary valve of the pneumatic part.

The aforementioned embodiment with two vent valves facilitates a particularly advantageous, flexible handling, both of the venting of the compressed air supply installation or the pneumatic system and also of the regeneration of the air drier. An adjustment of the nominal widths of the primary valve and the secondary valve not only allows regeneration of the air drier to take place, but moreover, venting of the compressed air supply installation, without excessive acoustics, particularly allowing a venting bang to be avoided.

In another embodiment, the vent valve arrangement may be created in the form of a controllable solenoid valve arrangement with a single solenoid valve. It should be understood that the foregoing embodiments are suitable for the direct connection or indirect connection of a total compressed air volume.

For a solenoid valve in the solenoid valve arrangement for forming the vent valve arrangement, an elastomer valve seat or a metal valve seat is particularly robust and resistant. A metal valve seat allows small opening strokes, as there is no elastomer indentation as in an elastomer valve seat. This means that the solenoid valve arrangement may be compact in design. In principle, an elastomer or a metal may also be used for a sealing element of a solenoid valve.

According to one embodiment, the compressed air supply installation is realized in the form of a mechanism with a housing arrangement, wherein the housing arrangement comprises a number of sections. The sections of a housing arrangement can be disposed relative to one another in an appropriate manner, advantageously in a U-form. It is particularly advantageous for there to be a drive disposed in a first section. The compressor that can be driven by the drive is disposed in a second section. The air drier and the vent valve arrangement are disposed in a third section connected to the second section via a pressure sources interface. When using a U-shaped arrangement of sections, the arrangement of the third section in a leg of the U-shaped arrangement is advantageous. In this way, pneumatic and/or control-electrical and/or electrical interfaces may be arranged horizontally when the compressed air supply line is installed in a vehicle. The aforementioned division may, in principle, also be achieved by arranging the first to third section in a configuration other than a U-shape, e.g., in a Z-shaped configuration.

The drying container advantageously forms part of the housing arrangement. This leads to a weight savings and a reduction in the number of parts in a compressed air supply installation. In particular, a cover housing a seal is provided as part of the housing arrangement, wherein the cover closes off the recess with the solenoid valve arrangement situated therein.

Moreover, the cover may be designed to accommodate pneumatic and/or control-electrical and/or electrical functional elements, such as an interface, electrical and/or pneumatic lines, valves, or the like. The cover may be designed to provide pneumatic interfaces—such as the compressed air supply interface and the vent interface or a valve in the form of a return valve. The cover may provide an electrical interface—such as a control interface.

A so-called venting section of the air drier, also referred to as the vent cap, is preferably at least partially disposed in the housing arrangement section. In particular, a venting section of the air drier is at least partially arranged in the cover. The venting section is at least partially divided into pneumatic lines, preferably by a molded seal. A seal in the cover can thereby be advantageously used for sealing purposes and for structuring the venting section. The housing arrangement and/or cover can thereby be simplified in structural terms.

A cover is modular in design. The cover is preferably constructed from a number of cover panels. A first cover panel preferably exhibits pneumatic functional means, particularly at least a pneumatic line, at least a seal and/or a pneumatic interface. A second cover panel exhibits control-electrical and/or electrical functional means, preferably at least an electrical control line and/or at least an electrical and/or control-electrical interface.

The connection of a compressed air supply installation in specific form can be achieved and varied overall by a cover provided with the aforementioned functional means, without the air drier or the housing arrangement in the housing parts having to be changed significantly. This facilitates standardized production of the compressed air supply installation with customized adjustments being made more easily, flexibly and cost-effectively by means of the cover.

Still other objects and advantages of the present invention will in part be obvious and will in part be apparent from the specification.

The present invention accordingly comprises the features of construction, combination of elements, and arrangement of parts, all as exemplified in the constructions herein set forth, and the scope of the invention will be indicated in the claims.

BRIEF DESCRIPTION OF THE DRAWINGS

The invention is explained in greater detail below using exemplary embodiments on the basis of the accompanying drawings, in which:

FIG. 1 is a circuit diagram of a pneumatic system with an air suspension system and a compressed air supply installation according to a first preferred embodiment of the present invention, in this case with a normally closed, controllable solenoid valve with a single armature;

FIG. 2 is a generalized circuit diagram of the compressed air supply installation according to a generalized embodiment compared with FIG. 1 and FIG. 4;

FIGS. 7A, 7B, and 7C show three modified dual-armature solenoid valves in detail for the compressed air supply installation in FIG. 7, namely, in (A) with a series connection of the primary valve and the secondary valve, wherein a throttle is formed on the valve seat, in (B) with a series connection of the primary valve and the secondary valve, wherein a throttle is formed on a high-pressure venting channel, and in (C) with a parallel connection of the primary valve and secondary valve.

REFERENCE NUMBER LIST

Figure 3:
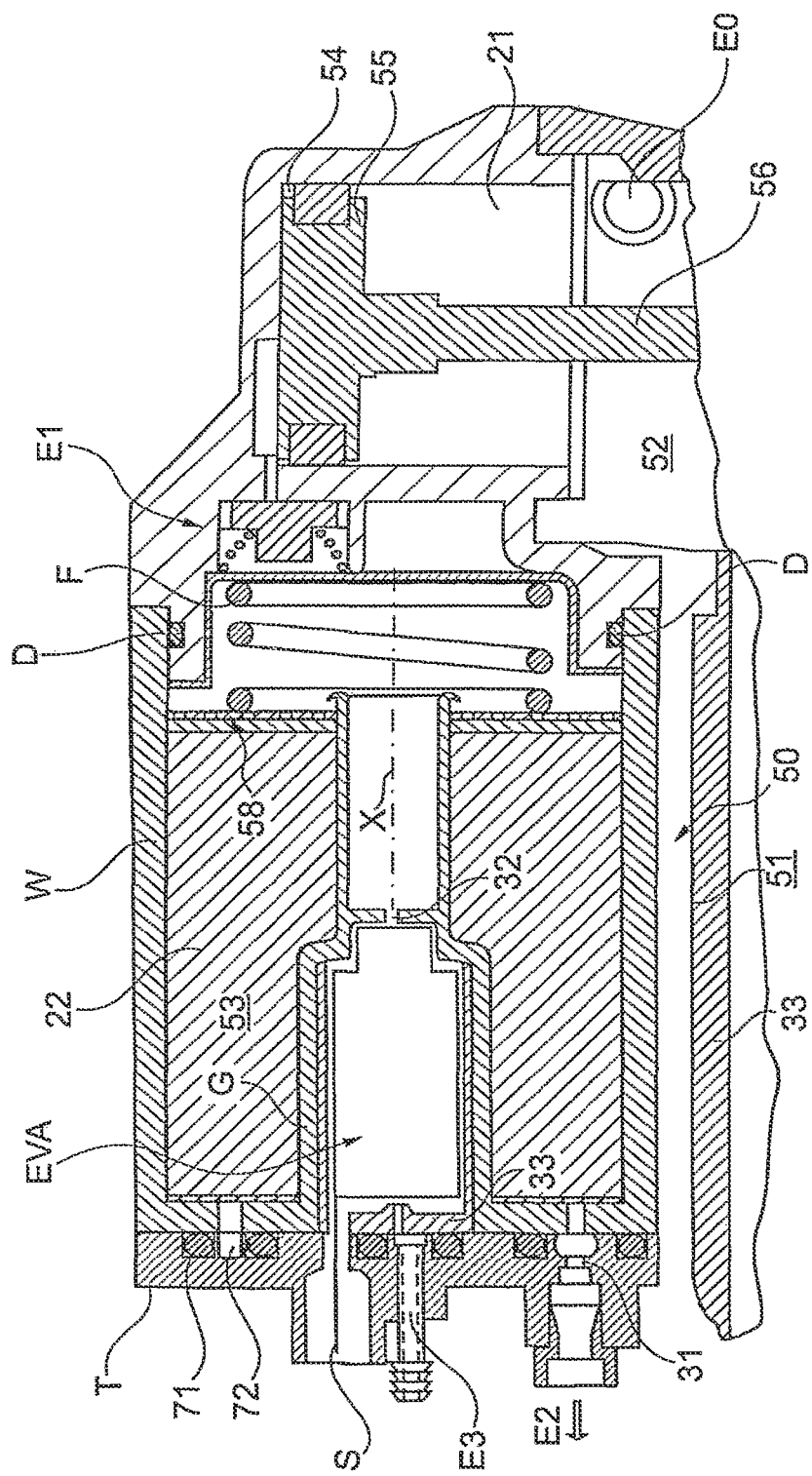
FIG. 3 shows a structural realization of a compressed air supply installation according to the embodiment depicted in FIG. 2.

0 Air supply
0.1 Filter
1 Compressed air supply
2 Compressed air connection
3 Vent port
3.1 Filter
10 Compressed air supply installation
20 Compressed air supply line
21 Air compressor
22 Air drier
30 Venting line
31 First throttle
32 Second throttle
33 Third throttle
40, 40' Solenoid valve arrangement
41 Primary valve
42 Secondary valve
43, 43' Solenoid part
44, 44' Pneumatic part
45, 46 Pneumatic connection
47, 48 Branch line
50 Housing arrangement
51 First section
52 Second section 53 Third section
54 Condensing chamber
55 Piston
56 Connecting rod and shaft
57 Outlet valve
58 Drying container
61B Primary armature
61' Armature
61A First sealing element
62A Second sealing element
61'A Sealing element
61'C Valve seat
61C First valve seat
62C Second valve seat
62B Secondary armature
63, 63' Coil body
64 Valve spring
65 Control line
66 Channel
67 Free space
68 Winding
68' Spring
69 Armature guide pipe
70 Casing tube
71 Molded seal
72 Line
73 Ducts
90 Pneumatic system
91 Bellows
92 Reservoir
93 Solenoid valve
94 Solenoid valve
95 Header
96 Valve manifold
100, 100' Pneumatic system
400, 400' Solenoid valve arrangement
D Seal
DLVA Compressed air supply installation
E0 Air supply interface, interface
E1 Pressure sources interface, interface
E2 Compressed air supply interface, interface
E3 Vent interface, interface
EVA Vent valve arrangement
S Control interface, interface
F Spring
G Recess
M Motor
P Vent flow
P̄ Supply flow
SE Control electronics
T, T' Cover
T1 First cover panel
T2 Second cover panel
X Drying container axis

DETAILED DESCRIPTION OF THE PREFERRED EMBODIMENTS

FIG. 1 shows a pneumatic system 100 with a compressed air supply installation 10 and a pneumatic system 90, in the form of an air suspension system in this case. The same reference numbers are used for identical or similar parts or parts with an identical or similar function, where appropriate. The air suspension system exhibits a number of bellows 91, which are each assigned to a wheel of a vehicle, and also a reservoir 92 for storing quickly accessible compressed air for the bellows 91. The bellows 91 and the reservoir 92 are connected to a common pneumatic line forming a header 95, which also creates the pneumatic connection between the compressed air supply installation 10 and the pneumatic system 90. A normally closed solenoid valve 93 is connected upstream of the bellows 91 in each case as a level control valve and a normally closed solenoid valve 94 is connected upstream of the reservoir 92 as a reservoir control valve. The solenoid valves 93, 94 are arranged in a valve manifold 96 of five solenoid valves in the present case. In a modified embodiment, the valve manifold 96 may exhibit other or fewer solenoid valves and/or solenoid valves arranged in a two-way valve manifold. A header refers quite generally to any kind of collecting line from which branch lines depart to bellows 91, a reservoir 92 and/or a line to the compressed air supply installation 10.

The compressed air supply installation 10 is used to operate the pneumatic system 90 in the form of the air suspension system and supplies the header 95 thereof via a compressed air connection 2. The compressed air supply installation 10 further exhibits an air supply 0 for drawing air via a filter 0.1 and a vent port 3 to release air via a filter 3.1 into the environment. Filter 3.1 or 0.1 is positioned downstream of the vent port 3 in the venting direction or upstream of the air supply 0 contrary to the filling direction. The pneumatic system 90 in the form of the air suspension system is arranged downstream of the compressed air connection 2 in the filling direction. The compressed air supply installation 10 moreover exhibits an air condenser 21 in the form of a compressor in a pneumatic connection between the air supply 0 and the compressed air supply 1, the compressor being driven by a motor M and provided to supply the compressed air supply 1 with compressed air. An air drier 22 and a first throttle 31, in the form of a regeneration throttle in this case, are further disposed in a pneumatic connection between the compressed air supply 1 and the compressed air connection 2. The filter 0.1, the air supply 0, the air compressor 21, the compressed air supply 1, the air drier 22 and the first throttle 31 are arranged along with the compressed air connection 2 in a compressed air line 20 forming the pneumatic connection to the header 95 in this order.

In a pneumatic connection between the compressed air supply line 1 and the vent port 3 in the compressed air supply installation 10, a vent valve arrangement in the form of a controllable solenoid valve arrangement 40 with a solenoid part 43 and a pneumatic part 44 for releasing air into a vent port 3 is provided. The solenoid valve arrangement 40 is configured in a venting line 30 forming the pneumatic connection, which exhibits a second throttle 32 as a vent throttle between the compressed air supply 1 and the solenoid valve arrangement 40. The solenoid valve arrangement 40 in this case is formed with a normally closed, single solenoid valve, which is activated via the control line 65.

A line section of the venting line 30 forming a pneumatic chamber on the pressure source side is advantageously provided for the pneumatic attachment of the solenoid valve arrangement 40 and the second throttle 32 to the compressed air supply line 20—to compressed air supply 1 in this case. The connection to the compressed air supply 1 between the air compressor 21 and the drier 22 results in compressed air being vented via the venting line 30 when the compressed air supply installation 10 is vented, the compressed air being removed upstream of the air drier 22, to put it simply, as undried air.

It is evident from the depiction of the embodiment in FIG. 1 that the compressed air supply installation 10 is configured with a solenoid valve arrangement 40 as a directly controlled vent solenoid valve arrangement, with which a direct connection of the entire compressed air volume is possible through actuation via a control line 65. The symbolically represented solenoid valve of the solenoid valve arrangement 40 is the single valve of the solenoid valve arrangement 40. This measure allows a quick and flexible venting of the pneumatic system 90 or of the compressed air supply installation 10, without an additional control valve being necessary. Savings can be made in terms of components and installation space. In particular, virtually no requirements in relation to a minimum pilot-control pressure for operating the compressed air supply installation 10 are necessary. In this way, a quick, flexible method of operation can be achieved in principle also in relation to the air drier 22.

Figure 4:
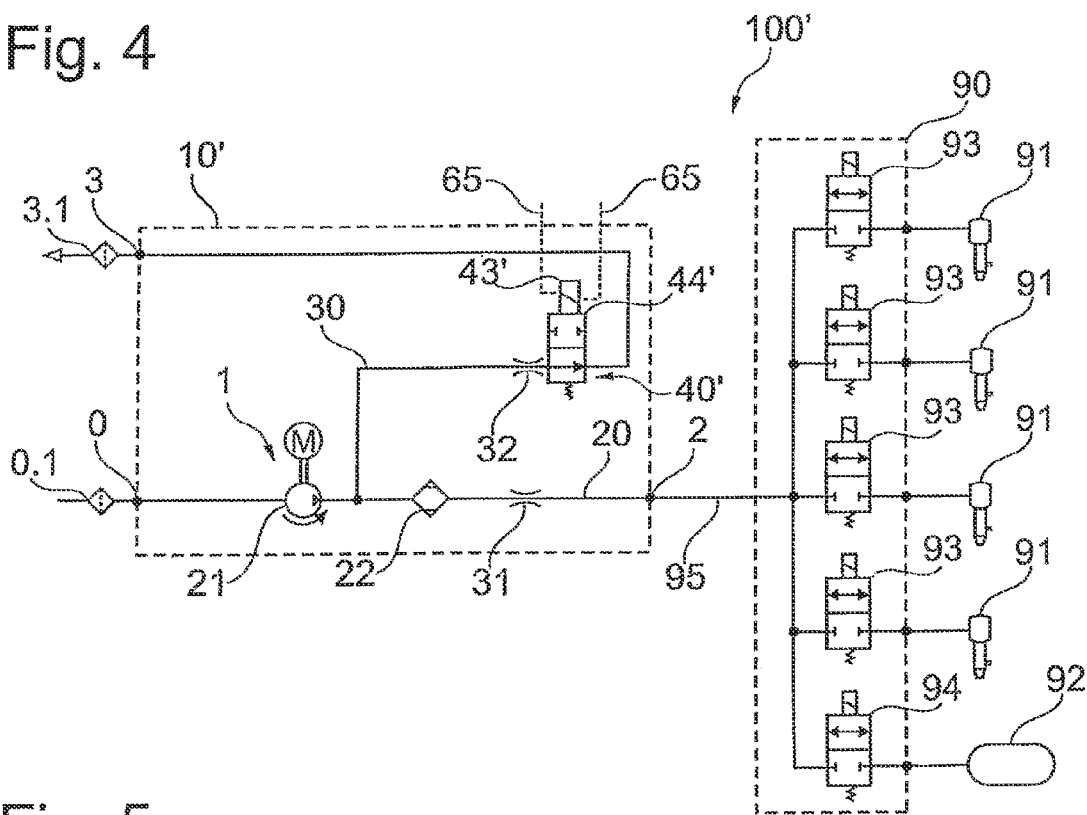
FIG. 4 is a circuit diagram of a pneumatic system with an air suspension unit and a compressed air supply installation according to a second preferred embodiment, in this case with a normally open, controllable solenoid valve with a single armature.

FIG. 2 shows a generalized form of a compressed air supply installation DLVA compared with the compressed air supply installation 10 in FIG. 1 and likewise compared with the compressed air supply installation 10' in FIG. 4. The vent valve arrangement EVA is only depicted symbolically (as a rectangle) and may be configured with a solenoid valve arrangement 40 in FIG. 1 or with a solenoid valve arrangement 40' in FIG. 4. However, the vent valve arrangement EVA is not limited to this in principle and may also be realized by a different appropriate solenoid valve arrangement of another valve arrangement.

FIG. 3 shows a generalized structurally realized embodiment of a compressed air supply installation DLVA corresponding to FIG. 2 with a vent valve arrangement EVA simply depicted symbolically (as a rectangle). This vent valve arrangement EVA may be designed, for example, with a structurally realized solenoid valve arrangement 400' in FIG. 5 (i.e., with a normally open, controllable solenoid valve having a single armature). The vent valve arrangement EVA may also designed with a structurally realized solenoid valve arrangement 400 in FIG. 6, FIG. 7, FIG. 7A or a structurally modified solenoid valve arrangement 40.1 or 40.2 in FIG. 7B or FIG. 7C (i.e., with a normally closed or open, controllable dual-armature solenoid valve). In other words, the invention—as described by means of a structural example in FIG. 3 ff.—can be realized in principle with the most varied solenoid valve arrangements in a different pneumatic circuit and/or structural realization.

The mode of operation of the compressed air supply installation 10 is illustrated in detail with the help of FIG. 1, as follows. The compressed air supply 1 is supplied with compressed air by drawing air through the filter 0.1 and the air supply 0, in that the air compressor 21 driven by the motor M compresses the air drawn in. The pneumatic system 90 in the form of the air suspension system is supplied with compressed air from the compressed air inlet 1 via the compressed air connection 2, the compressed air being supplied to the compressed air connection 1 via the air drier 22 and the first throttle 31. For this purpose, the compressed air line 20 of the compressed air supply installation 10 is connected to the header 95 of the pneumatic system 90 via the compressed air connection 2.

When the final reservoir pressure in the pneumatic system 90 is reached—within a pressure range of roughly 15 to 20 bar in the reservoir and 5 to 10 bar in the bellows in this case—the compressed air supply installation 10 is vented. A greater nominal width dimension is provided for the second throttle 32 between the compressed air supply 1 and the solenoid valve arrangement 40 than for the first throttle 31 between the air drier 22 and the compressed air connection 2. This produces the greatest possible pressure drop for the regeneration of the air drier. This allows an advantageous venting of the compressed air supply installation 10 and/or regeneration of the air drier 22 at an advantageously set pressure level. The greater the nominal width spacing, the better the regeneration of the air drier 22, since a comparatively increased pressure drop and therefore sufficiently high pressure change amplitude can thereby be achieved.

In the present case, a venting of the compressed air supply installation 10 can take place once the final reservoir pressure has been reached, i.e., once the reservoir filling end has been reached, and also when a vehicle is lowered during normal operation by opening the solenoid valve arrangement 40. Regeneration of the air drier 22 and also quick, flexible venting through the configuration of the nominal widths of the throttles 31, 32 is appropriately realized. FIG. 4 shows an embodiment of compressed air supply installation 10' in a pneumatic system 100' with a pneumatic system 90 as an alternative to the first embodiment in FIG. 1, falling under the general symbolic representation of the compressed air supply installation DLVA in FIG. 2. Again, for the sake of simplicity, the same reference numbers are used for identical or similar parts or parts with an identical or similar function, so that FIG. 1 can basically be referred to for descriptive purposes. A crucial difference between the compressed air supply installation 10' in FIG. 4 and the compressed air supply installation 10 in FIG. 1 is the design of the solenoid valve arrangement 40'. This is realized as a directly controlled solenoid valve arrangement 40'—but in this case with a normally open solenoid valve, which is configured accordingly with an open pneumatic part 44' when the solenoid part 43' is "dead" or deenergized.

The compressed air supply installation 10 in FIG. 1 or the compressed air supply installation 10' in FIG. 4 may be realized as a mechanism of a generalized compressed air supply installation DLVA with a housing arrangement 50 as depicted in FIG. 3, the housing arrangement exhibiting a number of housing sections. In a first symbolically depicted housing section 51, a drive—in this case in the form of a motor M—is disposed, and in a second section 52, the air compressor 21, which can be driven by the motor M. The air compressor 21 exhibits a piston 55 movable back and forth in the compression chamber 54, which is driven by the motor M via a shaft and a connecting rod 56 during operation. Air is supplied to the compression chamber 54 via an air supply interface E0 of the air supply 0. Compressed air located at the outlet of the compression chamber 54 is transferred via an outlet valve 57 or the like to a pressure source section E1 for the compressed air supply 1. The compressed air is delivered into a third section 53 of the housing arrangement 50. The third section 53 contains the air drier 22 with the drying container 58 and a vent valve arrangement EVA, for example a solenoid valve arrangement 40, 40' or structurally realized as a solenoid valve arrangement 400, 400', 40.1, 40.2. Housing parts of the sections 51, 52, 53 are sealed relative to one another in the present case by one or a plurality of seals D. A cover T closing off the housing part at the bottom is assigned to a housing part of the third section 53 formed with the wall W.

The cover T exhibits a compressed air supply interface E2 for the compressed air supply 2. The first throttle 31 is formed with a defined nominal width, in this case as an opening in the drying container 58. The cover T also forms a vent interface E3 for the vent port 3. The cover T also forms an electrical control interface S for connecting the control line 65 to the vent valve arrangement EVA. The cover T is largely congruent with a base contour of the drying container 58 in terms of its dimensions and can be placed on the drying container 58 in a virtually custom-fit fashion.

A housing part of the third section 53 is formed in this case by means of a wall W of the drying container 58 filled with dry granulate and by means of the cover T. The dry granulate is held under pressure by a spring F in the drying container 58. The wall W in turn forms at the bottom end of the drying container 58 a recess G arranged symmetrically to a largely central axis X of the drying container 58, the recess being free from drying agent. A vent valve arrangement EVA is housed in the recess G largely symmetrically, i.e., parallel and centrally to the axis of the drying container 58 in this case. On the bottom side the cover T tightly closes off the recess G along with the vent valve arrangement EVA contained therein. By means of the U-shaped arrangement of the first, second and third sections 51, 52, 53, an installation space-saving housing arrangement 50 is provided, which also allows horizontal interfaces—namely as S, E0, E2, E3. Moreover, a weight saving is achieved in that the outer contour of the drying container 58 of the air drier 22 and the cover T is used as part of the housing arrangement 50.

As part of the housing arrangement 50 of the compressed air supply installation DLVA, the cover T receives seals for closing off the third section 53 in a compressed air-tight manner. In addition, lines 72, which connect to corresponding ducts in the drying container 58 and are at least partially conducted in the cover T, project into the cover T. To form the lines 72, the seals in the cover T are realized as a molded seal 71. This divides a vent section also referred to as a vent cap at least partially into lines 72. Moreover, the cover T is crossed by interfaces. A compressed air supply interface E2 for the compressed air connection 2 and a vent interface E3 for the vent port 3 of the compressed air supply installation DLVA are thereby formed.

The control interface S is used to connect the vent valve arrangement EVA to the control line 65.

The generalized symbolic representation of the vent valve arrangement EVA in this case particularly comprises a solenoid valve arrangement 40, 40' in which both the arrangement of the pneumatic part 44 or 44' and also of the solenoid part 43 or 43' is provided in a common valve housing and in the recess G formed by the wall W. With this embodiment, a particularly compact arrangement can be achieved, e.g., by placing the solenoid valve arrangement 40, 40' in the recess G formed by the wall W of the drying container 58.

Figure 5:
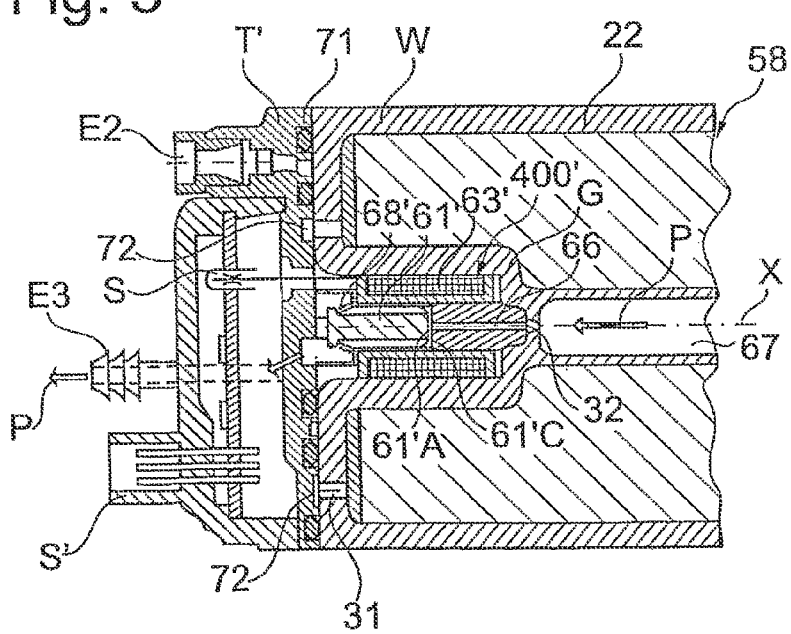
FIG. 5 shows a preferred structural realization of the compressed air supply installation, based on FIG. 3, with a preferred solenoid valve arrangement as a single-armature solenoid valve, for use in a pneumatic system according to FIG. 1 in this case.

In particular—as shown in detail by FIG. 5 ff.—a valve seat, a valve body and the valve seal of the pneumatic part are arranged in the recess G. Heat produced by the pneumatic part of the solenoid valve arrangement 40, 40' can thereby be delivered to the drying agent in the drying container 58. In particular, the heat produced by a coil can be delivered to the drying agent, so that the drier efficiency is increased.

Based on FIG. 3, FIG. 5 shows a concrete structural realization of a solenoid valve arrangement 400' with a single armature 61'. The solenoid valve arrangement 400' is shown in a normally open state, as specified in FIG. 4. As such, the solenoid valve arrangement 400' may be inserted in the recess G of the drying container 58 shown instead of the vent valve arrangement EVA depicted in generalized form in FIG. 3. The solenoid valve arrangement 400' is completely arranged in a recess G in the drying container 58 formed by the wall W. The recess G connects to a free space 67 upstream of the solenoid valve arrangement 400' on the axis X of the drying container 58. The solenoid valve arrangement 400' thereby forms a channel 66 through which air can flow through the drying container 58 in the recess G of the drying container 58.

The arrows in FIG. 5 show a venting flow P in a normally open state of the solenoid valve arrangement 400' as specified in FIG. 4. The solenoid part 43' shown in FIG. 4 is formed here by a coil body 63' and a single armature 61', which can be activated by the coil body 63' during flow. It is evident that when the coil body 63' is deenergized, the armature 61' is fixed by a spring 68'—a pressure spring in this case—such that a sealing element 61'A applied to the armature 61' is lifted by a valve seat 61'C assigned to the sealing element 61'A. The compressed air may escape in the venting flow P through a channel 66 forming the throttle 32 and past the armature 61'. The compressed air in the venting flow P further escapes through the channels 72 made in the cover T' to the vent interface E3 of the vent port 3. The cover T' is modified in comparison with the cover T illustrated in FIG. 3.

Figure 6:
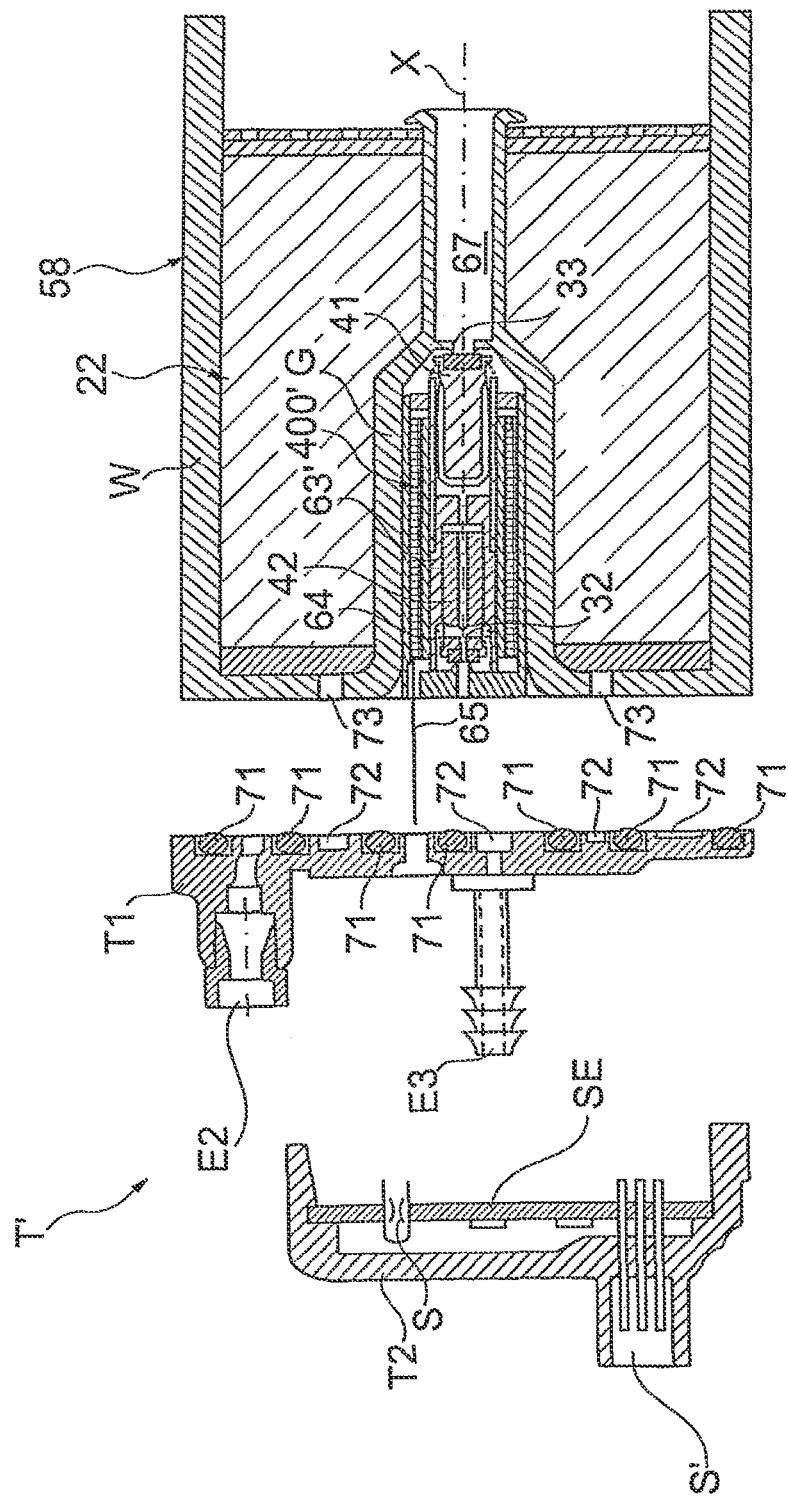
FIG. 6 shows a preferred drying container with a cover of modular design in an exploded view for a compressed air supply installation according to a third preferred embodiment with a dual-armature solenoid valve.

To provide an additional explanation, FIG. 6 shows the cover T' illustrated in FIG. 5 in an exploded view. The cover T' is designed to be largely congruent in terms of its outer edges with a cross section of the drying container 58. The cover T' receives a molded seal 71 as part of the housing arrangement 50, which divides a vent section in the cover T' into lines 72, which connect to corresponding ducts 73 in the drying container 58. The cover T' is, in turn, crossed by interfaces, namely by a compressed air supply interface E2, a vent interface E3 and a control interface S. Pneumatic functional means of the cover T' on the one hand—configured by a molded seal 71, lines 72 and interfaces E2, E3—are formed on a first cover panel T1. Electrical or control-electrical functional means of the cover T' on the other hand—formed by the control interface S with associated control electronics SE on a plate—are formed on a second cover panel T2. The first cover panel T1 receives the pneumatic functional means. The second cover panel T2 receives a control interface S and a plate carrying the control electronics SE or another carrier. The second cover panel T2 is configured in the form of a cover cap and has ducts for the vent interface E3 in each case. The compressed air supply interface E2 is guided past the second cover panel T2. The cover T' composed in modular form by the two cover panels T1, T2 therefore receives different, i.e., pneumatic or electrical/control-electrical functional means in different cover panels T1, T2. The modular embodiment of the cover T' shown has proved particularly advantageous, as it can be customized with interfaces—namely E2, E3, S—which can be adapted as needed. On the other hand, the further housing arrangement 50 with a compressed air supply installation DLVA may be provided unchanged and in standard form—although adjustable by the cover T'. The housing arrangement may be attached to a periphery with the adjusted cover T' or one of its cover panels T1, T2.

The control interface S comprises a contact to the control electronics SE, which can be connected with a control line 65 to the solenoid valve arrangement 400'—to the coil body 63' in this case. To this extent, the control interface S is conducted through the first cover panel T1, preferably to a non-pressurized location. By means of the control electronics SE connected in this manner, a control signal can be passed on from the control line 65 to a control connection S' of the second cover panel T2. The control interface S and the control connection S' are connected via the control electronics, which are preferably also connected to further control lines and thereby centrally process bundles of suitable control signals from the solenoid valve arrangement 400' and also from the further compressed air supply installation 10, 10' and supply them to the control connection S'. These may comprise, for example, control signals and also sensor signals, as well as data signals. Path sensor signals, level signals or data signals for vehicle data or system requirements are mentioned by way of example. Sensor signals from pressure and temperature sensors may also be bundled in the control electronics SE.

The board carrying the control electronics SE may also directly carry a sensor system, for example a pressure sensor and/or a temperature sensor. The control electronics SE may comprise suitable components for processing the sensor signals from this sensor system, so that corresponding sensor signals can be tapped via the control connection S' straight from the board of the control electronics SE.

In this way, a control unit can be realized in principle on the second cover panel T2 with the control electronics SE, the control unit working with a sensor system on the second cover panel T2 and also with the mechanics or pneumatics on the second cover panel T1 and the compressed air supply installation 10, 10'. Also, a complete mechatronic system can be formed by means of the cover T' incorporating the compressed air supply installation 10, 10'.

Figure 7:
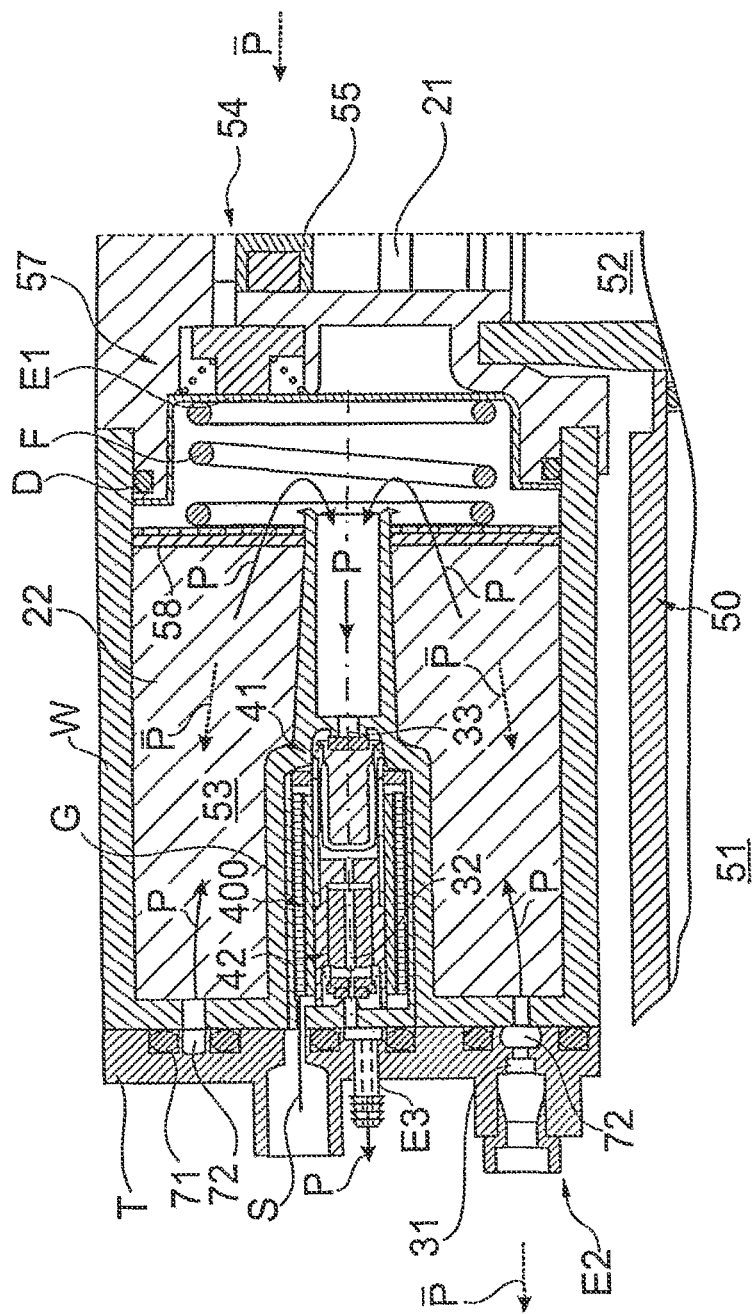
FIG. 7 shows a preferred structural realization of the compressed air supply installation according to the third preferred embodiment with a dual-armature solenoid valve and with a drying container depicted in FIG. 6, wherein the dual-armature solenoid valve has a primary valve and a secondary valve.

FIG. 7 shows an enlarged representation of a further specific structural realization of the compressed air supply installation DLVA described in generalized form using FIG. 3, wherein the representation is appropriately limited to the air drier 22. It can be seen from FIG. 7 that a solenoid valve arrangement 400 is formed, in this case in the shape of a dual-armature solenoid valve. As such, the solenoid valve arrangement 400 can be introduced instead of the generalized representation of a vent valve arrangement EVA in FIG. 3. The solenoid valve arrangement 400 is surrounded on three sides in this case by the recess G in the drying container 58. A vent flow P depicted by arrows—e.g., from a header 95 illustrated in FIG. 1 of a pneumatic system 90—may be conducted via the compressed air supply interface E2, the drying container 58 of the air drier 22 and the vent interface E3 in the cover T. The drying container 58 of the air drier 22 can also be flowed through by a symbolically represented supply flow $\overline{P}$. The supply flow $\overline{P}$ depicted using dotted arrows is used to supply the pneumatic system 90 via the header 95 and takes place via the air supply interface E0 depicted in FIG. 3, the pressure sources interface E1 and also the compressed air supply interface E2 evident in FIG. 7. The vent flow P runs in the opposite direction to a supply flow $\overline{P}$ and is also used for regeneration of the dry granulate found in the drying container 58.

The solenoid valve arrangement 400 can be identified in FIG. 7 in the form of a dual-armature solenoid valve in a housing of the same created by a casing tube 70. This shows, according to the enlarged detail representation in FIG. 7A, a primary armature 61B carrying a first sealing element, and a secondary armature 62B carrying a second sealing element, wherein these are arranged as the core of a coil in the coil body 63 thereof and are held with a valve spring 64 on an allocated valve seat. FIG. 7 shows overall a normally closed position of the dual-armature solenoid valve on both sides, in which both armatures sit on their own valve seat in each case. In the detail in FIG. 7A, the solenoid valve arrangement 400 is depicted as a dual-armature solenoid valve with a primary valve 41 and a secondary valve 42. The dual-armature solenoid valve has a primary armature 61B carrying a first sealing element 61A of the primary valve 41 and a secondary armature 62B carrying a second sealing element 62A of the secondary valve 42, which are arranged as the core of a coil, in a winding 68 of the coil cast in the coil body 63. The primary armature 61B and the secondary armature 62B are arranged on an axis X of the dual-armature solenoid valve in the armature guide pipe 69, through which compressed air can flow. Each of the first or second sealing elements 61A, 62A is assigned to a first or second valve seat 61C, 62C, in each case, wherein the first valve seat 61C and the second valve seat 62C lie opposite one another at the inlet and the outlet of the coil body 63 contained in a circular iron yoke. In principle, an elastomer seat is suitable for realizing the first or second valve seat 61C, 62C or also a metal limit stop, according to need and the leakage requirement. In this case, for an elastomer seat the first and/or second sealing element(s) 61A, 62A is/are also formed from an elastomer.

Figure 7A:
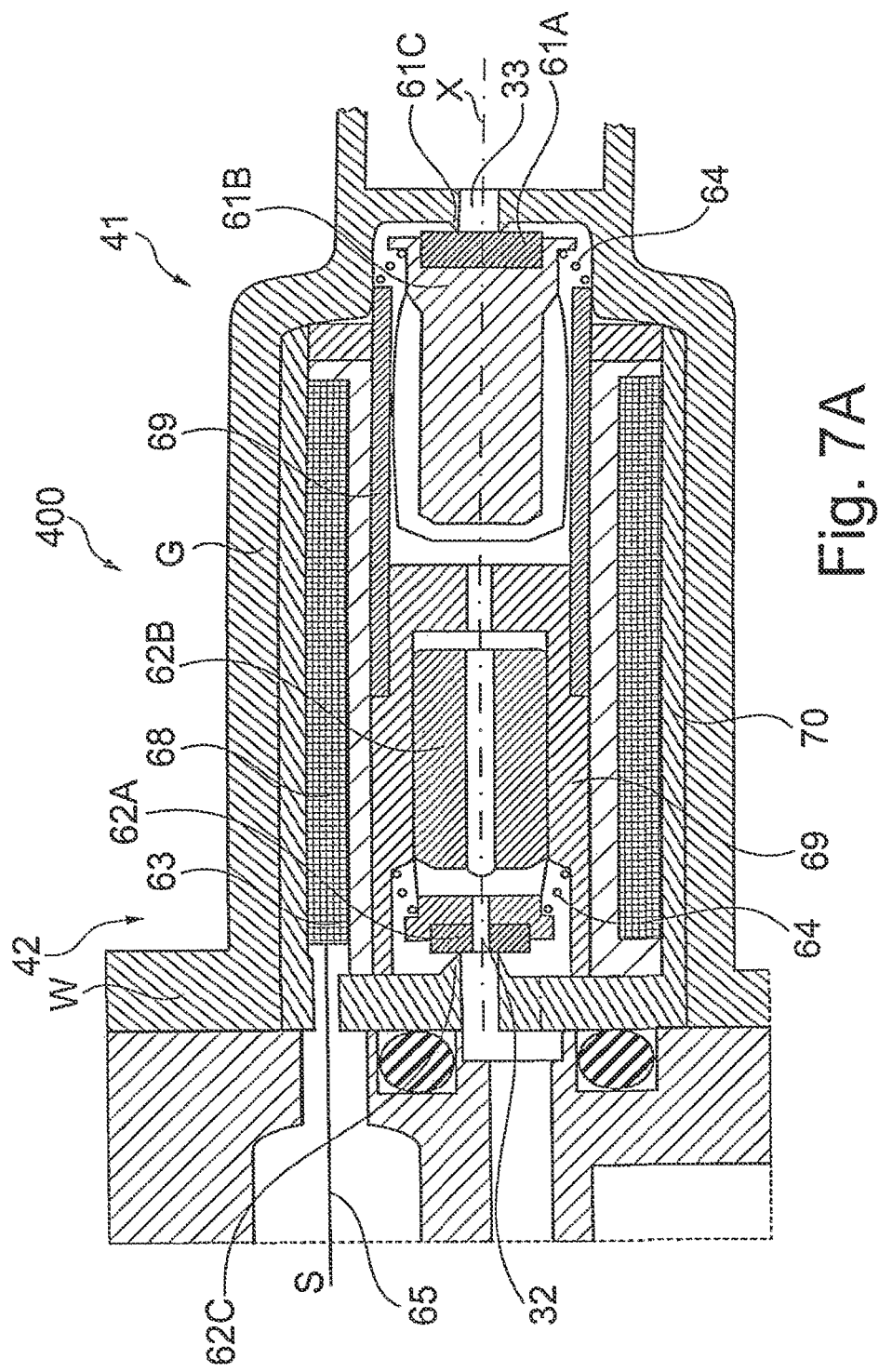

In a modified solenoid valve arrangement 40.1, in FIG. 7B, unlike in FIG. 7A—shown in FIG. 7B beneath the second valve seat 62C—a passage forming the throttle 32 can be identified in the valve floor, which is able to perform the function of a high-pressure vent. The valve floor is part of a casing tube 70 for forming a housing of the solenoid valve.

The dual-armature solenoid valve described here in FIG. 7, FIG. 7A is used to create a series arrangement of the primary valve 41 and the secondary valve 42 within the framework of a solenoid valve arrangement 400 or the modified solenoid valve arrangement 40.1 in FIG. 7B. In other words, the primary valve 41 to begin with and then the secondary valve 42 too can be used as the vent valve of the solenoid valve arrangement 400 or else of the modified solenoid valve arrangement 40.1.

Figure 7C:
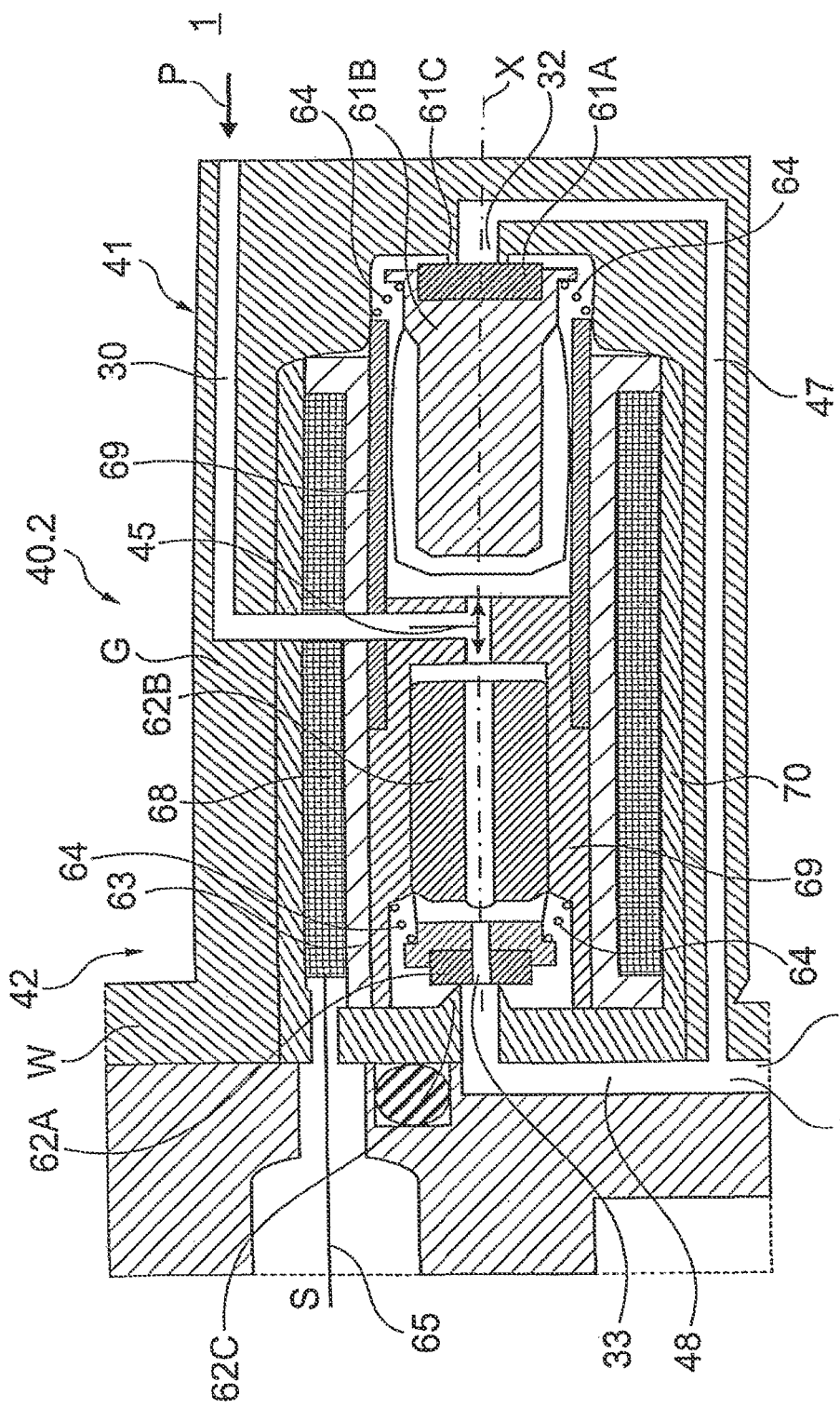

Within the framework of a further modified solenoid valve arrangement 40.2 in FIG. 7C, a parallel arrangement of the primary valve 41 and the secondary valve 42 is realized in a casing tube 70. Depending on the requirement in terms of nominal width, only the primary valve 41 or only the secondary valve 42 or both the primary valve 41 and the secondary valve 42 can be used to vent a compressed air flow. FIG. 7C shows a solenoid valve arrangement 40.2, in which the primary valve 41 and the secondary valve 42 are connected to one another in a parallel circuit. For simplicity's sake, the same reference numbers are used for identical or similar parts or parts with an identical or similar function, as have already been used in FIG. 7 to FIG. 7B, so that in relation to the fundamental structure and the parts used for the solenoid valve arrangement 40.2 likewise realized as a double armature solenoid valve, reference can be made in principle to the description in FIG. 7 to FIG. 7B. The double armature solenoid valve of the solenoid valve arrangement 40.2 is shown here in a normally closed state both for the primary valve 41 and also for the secondary valve 42. In other words, the solenoid valve arrangement 40.2 shown in FIG. 7C is in a normally closed state on both sides. This state is similar to the closed state on both sides, as shown in FIG. 7 to FIG. 7B for the solenoid valve arrangement 400, 40.1.

A significant difference between the solenoid valve arrangements 40.2 and those in FIG. 7 to FIG. 7B is the channeling for compressed air in the solenoid valve arrangement 40.2 described below. Specifically, an inlet-side, i.e., compressed air connection-side, pneumatic connection 45 and an outlet-side, i.e., vent-side, pneumatic connection 46 of a venting line 30 can be identified in FIG. 7C. Between the connections 45, 46, the primary valve 41 is pneumatically connected in a first branch line 47 and the secondary valve 42 in a second branch line 48. Furthermore, the nominal width of a second throttle 32 at the primary valve 41 can be identified in FIG. 7C as the opening cross section of an inlet to a guiding space for the primary armature 61B extending as far as the connection 45. Moreover, the nominal width of a third throttle 33 can be identified as the opening width of the second valve seat 62C of the secondary valve 42. A venting flow P is represented in FIG. 7B by arrows in the venting line 30. As already explained with the help of FIG. 1A, the venting flow P can thereby be optionally conducted via the primary valve 41 with the associated nominal width of the second throttle 32 and/or the secondary valve 42 with the associated nominal width of the third throttle 33 from a compressed air supply 1 to a vent port 3.

Switching currents for the sequential or simultaneous switching of the primary valve 41 and the secondary valve 42 in a solenoid valve arrangement 40.1 or 40.2 can be configured accordingly. Both the primary valve 41 and the secondary valve 42 can be switched through arrangement in a common coil body 63 via the same control current.

In summary, a compressed air supply installation DLVA, 10, 10' for operating a pneumatic system 90, particularly a vehicle air suspension system, has been described, which comprises:

an air supply 0 and an air compressor 21 for supplying a compressed air supply 1 with compressed air, a pneumatic connection, particularly a venting line 30, with a vent valve arrangement EVA and a vent port 3 for venting air, and a pneumatic connection, particularly a compressed air supply line 20, with an air drier 22 and a compressed air connection 2 for supplying the pneumatic system 90 with compressed air, wherein the air drier 22 exhibits a drying container 58 containing a drying agent through which compressed air can flow.

The drying container 58 exhibits a wall W forming a recess G free from drying agent and the vent valve arrangement EVA is arranged at least partly in the recess G. In the embodiment of a structural realization illustrated in FIG. 7A, FIG. 7B and FIG. 7C, the vent valve arrangement EVA exhibits a valve housing, which is formed substantially by means of a casing tube 70. The casing tube 70 is completely introduced into the recess G, without projecting from it in this case. In the embodiment in FIG. 7C, part of the line run to the vent valve arrangement EVA is additionally integrated in the wall W. To this extent, the wall W in this case at least partially forms the valve housing rather than, or in addition to, the casing tube 70.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall there-between.

What is claimed is:

1. A compressed air supply system for operating a pneumatic system, the compressed air supply system comprising:
an air supply and an air compressor configured to supply a compressed air supply with compressed air;
a venting line having a vent valve arrangement and a vent port configured to vent air; and
a compressed air supply line having an air dryer and a compressed air connection configured to supply the pneumatic system with compressed air, wherein the air dryer includes a drying container containing a drying agent through which compressed air can flow, wherein the drying container includes a wall defining a recess free from the drying agent and the vent valve arrangement is disposed at least partly in the recess, and wherein the vent valve arrangement is a controllable solenoid valve arrangement having a primary valve, a secondary valve, and a solenoid part, the primary valve and the secondary valve being activatable by a common controller of the solenoid part acting on both.

2. A compressed air supply system for operating a pneumatic system, the compressed air supply system comprising:
an air supply and an air compressor configured to supply a compressed air supply with compressed air;
a venting line having a vent valve arrangement and a vent port configured to vent air;
a compressed air supply line having an air dryer and a compressed air connection configured to supply the pneumatic system with compressed air; and
a housing arrangement, wherein at least one of (i) a first section of the housing arrangement includes a motor and (ii) a second section includes the air compressor drivable by the motor and (iii) a third section connected to the second section via a pressure sources interface includes the air dryer and the vent valve arrangement, wherein the air dryer includes a drying container containing a drying agent through which compressed air can flow, wherein the drying container includes a wall defining a recess free from the drying agent and the vent valve arrangement is disposed at least partly in the recess, wherein the drying container forms part of the housing arrangement, and wherein the drying container includes a cover having a venting section at least partially divided into pneumatic lines.

3. The compressed air supply system as claimed in claim 2, wherein the venting section of the drying container cover is at least partially divided into pneumatic lines by a single molded seal.

4. A compressed air supply system for operating a pneumatic system, the compressed air supply system comprising:
an air supply and an air compressor configured to supply a compressed air supply with compressed air;
a venting line having a vent valve arrangement and a vent port configured to vent air; and
a compressed air supply line having an air dryer and a compressed air connection configured to supply the pneumatic system with compressed air, wherein the air dryer includes a drying container containing a drying agent through which compressed air can flow, wherein the drying container includes a wall defining a recess free from the drying agent and the vent valve arrangement is disposed at least partly in the recess, wherein the drying container comprises a first chamber, wherein the recess is disposed in the drying container adjacent the first chamber, and wherein the drying agent is disposed in the first chamber and at least partly surrounds the recess.

5. The compressed air supply system as claimed in claim 4, wherein the vent valve arrangement includes a valve housing formed at least partially by at least one of the wall and a casing tube.

6. The compressed air supply system as claimed in claim 4, wherein the vent valve arrangement is a controllable solenoid valve arrangement having a solenoid part and a pneumatic part, at least one of the solenoid part and the pneumatic part being at least partially arranged in the recess.

7. The compressed air supply system as claimed in claim 4, wherein the vent valve arrangement is a controllable solenoid valve arrangement configured for direct connection of a compressed air volume from a free space without any fittings.

8. The compressed air supply system as claimed in claim 4, wherein the vent valve arrangement is a controllable solenoid valve arrangement having a single armature.

9. The compressed air supply system as claimed in claim 4, wherein the vent valve arrangement is a solenoid valve arrangement including at least one of (i) an elastomeric valve seat and (ii) one of an armature and a valve seat made of metal.

10. The compressed air supply system as claimed in claim 4, wherein the recess is arranged substantially symmetrically with respect to an axis of the drying container.

11. The compressed air supply system as claimed in claim 10, wherein the recess is arranged at least one of substantially parallel and substantially coaxial to the axis of the drying container.

12. The compressed air supply system as claimed in claim 4, wherein the recess connects to a free space without any fittings upstream of the vent valve arrangement, the free space and the vent valve arrangement being arranged substantially coaxially to an axis of the drying container.

13. The compressed air supply system as claimed in claim 4, further comprising a housing arrangement, wherein at least one of (i) a first section of the housing arrangement includes a motor and (ii) a second section includes the air compressor drivable by the motor and (iii) a third section connected to the second section via a pressure sources interface includes the air dryer and the vent valve arrangement, and wherein the drying container forms part of the housing arrangement.

14. The compressed air supply system as claimed in claim 4, wherein the pneumatic system is a vehicle air suspension system.

15. A vehicle air suspension system comprising the compressed air supply system as claimed in claim 4.

* * * * *